United States Patent [19]
Golden et al.

[11] Patent Number: 5,897,686
[45] Date of Patent: Apr. 27, 1999

[54] SYNTHESIS GAS DRYING AND $CO_2$ REMOVAL

[75] Inventors: Timothy Christopher Golden, Allentown, Pa.; David Richard Barnes, Jr., Houston, Tex.

[73] Assignee: Air Products and Chemicals, Inc., Allentown, Pa.

[21] Appl. No.: 08/956,075

[22] Filed: Oct. 22, 1997

[51] Int. Cl.$^6$ .......................... B01D 53/047; B01D 53/26
[52] U.S. Cl. .................... 95/99; 95/105; 95/106; 95/120; 95/123; 95/139
[58] Field of Search .............. 95/99, 100, 103, 95/105, 106, 118–123, 139; 96/130–133, 143, 144

[56] References Cited

U.S. PATENT DOCUMENTS

| | | | |
|---|---|---|---|
| 2,968,160 | 1/1961 | Schilling et al. | 62/14 |
| 3,841,058 | 10/1974 | Templeman | 55/33 |
| 4,030,896 | 6/1977 | Wimber et al. | 55/33 |
| 4,233,038 | 11/1980 | Tao | 95/139 X |
| 4,249,915 | 2/1981 | Sircar et al. | 55/26 |
| 4,373,935 | 2/1983 | Ausikaitis et al. | 95/123 |
| 4,636,225 | 1/1987 | Klein et al. | 95/120 |
| 4,732,596 | 3/1988 | Nicholas et al. | 62/18 |
| 5,202,096 | 4/1993 | Jain | 95/139 X |
| 5,529,610 | 6/1996 | Watson et al. | 95/139 X |
| 5,531,809 | 7/1996 | Golden et al. | 95/101 |
| 5,614,000 | 3/1997 | Kalbassi et al. | 95/139 X |
| 5,728,198 | 3/1998 | Acharya et al. | 95/139 X |
| 5,769,928 | 6/1998 | Leavitt | 95/119 X |

*Primary Examiner*—Robert Spitzer
*Attorney, Agent, or Firm*—Geoffrey L. Chase

[57] ABSTRACT

A process and apparatus for drying and removing carbon dioxide from a hydrogen and carbon monoxide containing synthesis gas by using adsorption vessels containing a first layer of 13 X-zeolite and a second layer of 3 A-zeolite in which the 3 A-zeolite precludes the formation of water of reaction when dry and carbon dioxide-free synthesis gas is used to regenerate the adsorption vessel countercurrent to feed flow of the synthesis gas.

17 Claims, No Drawings

SYNTHESIS GAS DRYING AND CO$_2$ REMOVAL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Carbon monoxide is typically produced and recovered from synthesis gases from one of several well understood reforming methods including: steam-methane reforming, auto-thermal reforming, oxygen reforming, dry carbon dioxide reforming, partial oxidation and combinations of the above reformation reactions.

The synthesis gases produced from these reactions typically contain hydrogen, carbon monoxide, carbon dioxide, methane, water and possibly nitrogen and argon.

This synthesis gas is usually cooled in several heat exchangers to raise steam, preheat reformer feed, preheat boiler feedwater and heat makeup water. The cooled reformer synthesis gas then enters a typical carbon dioxide removal system wherein carbon dioxide is removed from the synthesis gas. The carbon dioxide removal system typically consists of chemical absorption of carbon dioxide into a liquid solvent, which is regenerated in a stripping column. This system uses a solvent selected from the group consisting of MEA, MDEA, Rectisol, Benfield or other well known systems in the prior art.

In the case of recovery of CO alone, the carbon dioxide stripped synthesis gas leaving the carbon dioxide removal system would enter a thermal swing adsorption (TSA) drier where water and residual carbon dioxide are removed down to part per billion (ppb) levels. Traditionally, this is achieved using zeolites, like 13 X-zeolite. Often a 2 bed system is used where one bed is on stream for a number of hours, while the other bed is being regenerated with hot gas, then cooled down to feed temperature. Three bed systems can also be employed. The water and carbon dioxide-free synthesis gas then enters a cryogenic distillation system where pure carbon monoxide is recovered. It is important to remove water and carbon dioxide to trace levels to avoid plugging the cryogenic distillation system.

The removal of water and trace amounts of CO$_2$ from various gas mixtures is the subject of much prior art. A vast majority of the prior art deals with the pre-purification of air prior to cryogenic distillation. Both pressure swing adsorption (PSA) and thermal swing adsorption (TSA) processes are taught.

Thermal swing adsorption processes for carbon dioxide and water removal from air are disclosed in U.S. Pat. Nos. 2,968,160 and 4,030,896. In these systems atmospheric air is compressed to about 100 psia followed by water cooling. The air is then further cooled using refrigerated ethylene glycol to remove water by condensation. The gas is then passed to a molecular sieve bed where the remaining carbon dioxide and water are removed by adsorption. The sorbent beds are operated in thermal swing mode with equal periods for adsorption and regeneration (heat-up, depressurization, cool-down and repressurization).

U.S. Pat. No. 4,249,915 discloses a process where moisture and carbon dioxide are removed from atmospheric air by adsorption in separate beds. The moisture removal bed (filled with a solid adsorbent effective in the adsorption of water) is regenerated by pressure swing adsorption in a relatively short operating cycle, while the carbon dioxide laden bed (filled with an adsorbent effective in the retention of carbon dioxide) is regenerated thermally at considerably longer time intervals.

U.S. Pat. No. 3,841,058 describes a 2 bed process for the removal of water, methanol and carbon dioxide from natural gas. The first bed contains an adsorbent for removal of water and methanol which is thermally regenerated at elevated temperature (about 300° C.). The second bed contains an adsorbent for carbon dioxide removal which is regenerated at temperatures not exceeding 100° C.

U.S. Pat. No. 5,531,809 teaches the use of 3 A-zeolite to dry synthesis gas as a pretreatment layer in a vacuum swing adsorption (VSA) system to produce high purity CO. The 3A layer is placed on the feed end of the adsorption bed.

U.S. Pat. No. 4,732,596 discloses a process for the co-production of carbon monoxide and hydrogen. The prior art method for production of CO is given in FIG. 1 of that disclosure. It shows the presence of driers after the MEA carbon absorbent for removal of water and carbon dioxide. Typically these system are TSA's filled with appropriate zeolite like 4 A-zeolite or 13 X-zeolite, which are capable of both water and carbon dioxide retention.

The prior art has not recognized a problem that occurs during the repressurization of adsorbent used to dry and remove carbon dioxide from synthesis gas, wherein water and carbon dioxide can reform from the synthesis gas used to repressurize the adsorbent, and the prior art has not provided the solution to this previously unrecognized problem, which problem and the present invention's solution to the problem will be set forth in greater detail below.

BRIEF SUMMARY OF THE INVENTION

The present invention is a process for the removal of water and carbon dioxide from a feed synthesis gas containing water and carbon dioxide by contacting the feed synthesis gas at elevated pressure with a zone of a first adsorbent capable of adsorbing water and carbon dioxide from the feed synthesis gas by introducing the feed synthesis gas into an inlet end of the zone and removing a substantially dry and carbon dioxide-free synthesis gas from an outlet end of the zone, regenerating the zone by at least reducing the pressure of the zone and repressurizing the zone from the outlet end with substantially dry, carbon dioxide-free synthesis gas, wherein the outlet end of the zone of adsorbent contains a second adsorbent capable of adsorbing water but not capable of adsorbing carbon monoxide and the substantially dry, carbon dioxide-free synthesis gas used to repressurize the zone of adsorbent contacts the second adsorbent prior to contacting the first adsorbent.

Preferably, the first adsorbent is 13 X-zeolite.

Preferably, the second adsorbent is 3 A-zeolite.

More preferably, the 3 A-zeolite is substantially cation exchanged with potassium.

Preferably, the zone is further regenerated with a substantially dry and carbon dioxide-free gas at elevated temperature introduced through the outlet end of the zone.

Preferably, the elevated temperature is in the range of approximately 100 to 400° C.

Preferably, the zone is cooled with a substantially dry and carbon dioxide-free gas at ambient temperature subsequent to regeneration with a substantially dry and carbon dioxide-free gas at elevated temperature.

Preferably, the substantially dry and carbon dioxide-free gas is selected from the group consisting of nitrogen, hydrogen, carbon monoxide, synthesis gas and mixtures thereof.

Preferably, the second adsorbent comprises from approximately 1 to 30% by length of the zone.

More preferably, the second adsorbent comprises approximately 15% by length of the zone.

Preferably, at least two parallel connected zones are used in which the feed synthesis gas contacts a first zone while a second zone is being regenerated.

Preferably, the first adsorbent comprises one or more layers of adsorbent selected from the group consisting of 13 X-zeolite, 4 A-zeolite, mordenite, activated alumina and mixtures thereof.

Alternatively, the first adsorbent comprises a layer of silica gel followed by a layer of adsorbent selected from the group consisting of 13 X-zeolite, activated alumina and mixtures thereof.

Preferably, the elevated pressure of the feed synthesis gas is greater than approximately 300 psig.

Preferably, the reduced pressure of regenerating is in the range of approximately 0 to 500 psig.

Preferably, the substantially dry and carbon dioxide-free synthesis gas is at a pressure of approximately said elevated pressure feed synthesis gas.

The present invention is more particularly a process for the removal of water and carbon dioxide from a feed gas containing predominantly hydrogen and carbon monoxide and minor amounts of water and carbon dioxide by contacting the feed gas at elevated pressure with a zone of 13 X-zeolite adsorbent capable of adsorbing water and carbon dioxide from the feed gas by introducing the feed gas into an inlet end of the zone and removing a substantially dry and carbon dioxide-free, predominantly hydrogen and carbon monoxide gas from an outlet end of the zone, regenerating the zone by depressurizing said zone and passing a substantially dry, carbon dioxide-free purge gas through the zone at elevated temperature and reduced pressure and repressurizing the zone from the outlet end with substantially dry, carbon dioxide-free predominantly hydrogen and carbon monoxide gas, wherein the outlet end of the zone of adsorbent contains 3 A-zeolite adsorbent capable of adsorbing water but not capable of adsorbing carbon monoxide and the substantially dry, carbon dioxide-free predominantly hydrogen and carbon monoxide gas used to repressurize the zone of adsorbent contacts the 3 A-zeolite adsorbent prior to contacting the 13 X-zeolite adsorbent.

The present invention is also an adsorption vessel for adsorbing water and carbon dioxide from synthesis gas containing water and carbon dioxide comprising an exterior vessel shell, an inlet to receive feed synthesis gas containing water and carbon dioxide, an outlet for removing a product synthesis gas with a reduced water and carbon dioxide content, a layer of a first adsorbent capable of adsorbing water and carbon dioxide near the inlet of the vessel and a layer of a second adsorbent capable of adsorbing water but not carbon monoxide near the outlet of the vessel.

Preferably, the first adsorbent is 13 X-zeolite and the second adsorbent is 3 A-zeolite.

Preferably, the second adsorbent is approximately 1–30% by length of the adsorption vessel.

BRIEF DESCRIPTION OF SEVERAL VIEWS OF THE DRAWINGS

Not Applicable

DETAILED DESCRIPTION OF THE INVENTION

The present invention is a thermal swing adsorption process for the removal of carbon dioxide and water from high pressure (greater than 300 psig, preferably 300–1200 psig) synthesis gas (mixtures of hydrogen, carbon monoxide, carbon dioxide, methane, water and possibly nitrogen and argon). The unique and unobvious aspect of this invention is that the adsorption vessel or zone contains a layer of an adsorbent that adsorbs water, but not capable of adsorbing carbon dioxide or carbon monoxide at the product end or outlet of the adsorption vessel or zone. A preferred adsorbent is 3 A-zeolite (more preferably potassium cation exchanged to a substantial degree, ie. at least 50%, most preferably at least 80%). The 3 A-zeolite section comprises approximately 1–30% of the total adsorption vessel length, preferably 15% of the adsorption vessel length (vessel length is from inlet to outlet of the vessel). The remaining (feed section) adsorbent in the vessel can include various zeolites, 13 X-zeolite, 4 A-zeolite, mordenite or activated alumina. Alternatively, a layer of silica gel for water removal (approximately 10–20% of adsorption vessel length), followed by a layer of the previously listed zeolites or activated alumina for carbon dioxide removal could be employed.

As the pressure of the synthesis gas increases and the mole fraction of CO is increased, significant heat-up of the TSA adsorption vessel has been noted by the present inventors during adsorption vessel repressurization. This temperature rise can cause some operational problems for the plant. Firstly, the temperature rise during repressurization is pushed out of the adsorption vessel once the adsorption step proceeds. This causes the temperature of the gas exiting the TSA adsorption vessel to rise, causing operational difficulties in any downstream cryogenic CO separation cold box (additional refrigeration needs). Secondly, the high temperature together with long residence times of synthesis gas in the adsorption vessel can lead to low level reactions like Boudard ($2CO=CO_2+C$) and methanation ($3H_2+CO=CH_4+H_2O$).

The occurrence of these reactions during the TSA cycle has not been appreciated in the prior art.

The presence of these reactions is in part due to the fact that some newer types of synthesis gas generation, e.g. partial oxidation, yield higher pressure streams than previous synthesis gas generation processes. The production of carbon dioxide and/or water by these reactions yields an initially impure stream that exits the TSA adsorption vessel. The carbon dioxide and water then freeze out in any downstream cryogenic CO separation cold box, causing pressure drop problems which result in the need to defrost the cold box.

Thus, the problem facing the industry is to eliminate unwanted secondary reactions, like methanation and the Boudard reaction during TSA adsorption vessel repressurization. The process conditions which facilitate these reactions include 1) high temperature, 2) the presence of a catalyst with adsorption of CO adjacent such catalyst and 3) long residence time. All three conditions are satisfied when TSA adsorption vessel repressurization is achieved with high partial pressure CO-containing gas and 13 X-zeolite as the adsorbent, which is the industry standard practice.

It has been determined that a small layer of 3 A-zeolite at the product or outlet end of the TSA adsorption vessel minimizes these reactions and produces a much purer synthesis gas which exits the TSA adsorption vessel. The 3 A-zeolite is effective, because it does not allow CO to enter its pore structure. This keeps the temperature low during repressurization and restricts CO from the pore system of the zeolite which could well be the locus of catalytic activity. The 3 A-zeolite is also effective, because it adsorbs any water formed in any methanation reaction occurring on the other or first adsorbent near the inlet end of the TSA adsorption vessel, when co-current feed synthesis gas flow is reinitiated when the adsorption vessel goes back online after regeneration.

The process is preferably carried out in at least a 2-adsorption vessel system with one adsorption vessel on adsorption (producing dry, carbon dioxide-free synthesis gas) and the other adsorption vessel being regenerated (1-depressurization, 2-heat-up and cool-down with counter-current inert purge gas, i.e., nitrogen, and 3-repressurization with dry, carbon dioxide-free gas). The cycle is preferably set up so that the adsorption time is equal to the regeneration time. The adsorption (on-line) time can vary from 4 to 48 hours. Alternatively, multiple adsorption vessel schemes are possible, such as with 2 adsorption vessels on adsorption and one adsorption vessel being regenerated.

Regeneration is accomplished by heating in a flow of dry, carbon dioxide free gas in a direction countercurrent to feed. This can be nitrogen, product synthesis gas, hydrogen, carbon monoxide etc. Preferably, regeneration temperature can vary from 100 to 400° C., optimally about 200° C. The minimum amount of regeneration gas is dictated by the amount of heat supplied by the hot regeneration gas. The heat supplied must equal the amount of heat needed to desorb carbon dioxide and water, as well as heat the adsorbent and vessel shell up to the required regeneration temperature. Alternatively, heat-up can be continued until the gas temperature exiting the adsorption vessel reaches some desired outlet temperature. Preferably, the adsorption vessels are insulated, either externally or internally.

The repressurization gas is typically at ambient temperature and comprises a dry, carbon dioxide-free gas, preferably dry, carbon dioxide-free synthesis gas. This gas is introduced through the adsorption vessel outlet countercurrent to the feed synthesis gas introduction that is conducted through the inlet of the adsorption vessel.

The feed gas temperature to the TSA can vary from 0 to 50° C. and the feed gas pressure can vary from 300 to 1200 psig. The regeneration gas pressure can vary from 0 to 500 psig. Repressurization is conducted up to approximately the feed gas pressure.

EXAMPLE 1

Tests at a synthesis gas generating plant have shown that replacing 2.5 feet of 13 X-zeolite at the product or outlet end of the TSA adsorption vessel with potassium-cation exchanged 3 A-zeolite (total adsorption vessel length of 15 feet, adsorption vessel diameter of 8.5 feet) reduced the water content exiting the adsorption vessel several fold. Before addition of the 3 A-zeolite, the water content entering the downstream cold box for cryogenic CO separation (TSA effluent) was 25–35 ppb. After addition of 3 A-zeolite at the product or outlet end of the adsorption vessel, the water content in the effluent was reduced to about 2 ppb. This result clearly shows that the 3 A-zeolite addition significantly reduced the water content in the effluent gas going to the cryogenic CO separation cold box. This reduction in water content allows longer running time before the downstream cryogenic CO separation cold box has to be defrosted.

The use of 3 A-zeolite on the product or outlet end of the TSA adsorption vessel is unobvious, because water is more strongly adsorbed on zeolite adsorbents like 13 X-zeolite than carbon dioxide. Consequently, water will remain at the feed or inlet end of the adsorption vessel, while carbon dioxide migrates to the product or outlet end of the adsorption vessel, and its breakthrough determines the adsorption on-stream time. The use of 3 A-zeolite provides unexpected results, because the pore structure of 3 A-zeolite is too small to allow entrance of the key breakthrough component, carbon dioxide. Therefore, one skilled in the art would not consider placing it in the outlet end of an adsorption vessel where it would only see duty for carbon dioxide and not water. The in-situ production of water, which previously had not been known or appreciated, makes placement of 3 A-zeolite on the product or outlet end of a synthesis gas drying and carbon dioxide removal adsorption vessel a unique unexpected solution to a problem which has previously gone unrecognized and unremedied.

The unique aspect of the present invention is that a layer of 3 A-zeolite is placed on the product or outlet end of a TSA adsorption vessel used for carbon dioxide and water removal from synthesis gas. What has not been appreciated in the prior art is that water can be formed during adsorption vessel repressurization when the feed pressure to the plant is high (typically greater than 300 psig), the mole fraction of CO in the system is high (typically greater than 25%) and standard zeolite adsorbents, like 13 X-zeolite, are used and elevated temperatures exist due to adsorption vessel heat-up caused by CO adsorption. This adsorption vessel heat-up (up to 50° C.) together with the long residence time of the synthesis gas in the adsorption vessel prior to the feed step and the presence of a catalyst (13 X-zeolite) produce a situation where unwanted reactions like methanation ($CO+3H_2=CH_4+H_2O$) can occur. By placing a small layer of 3 A-zeolite at the product or outlet end of the TSA adsorption vessel, these reactions are minimized and a much purer synthesis gas exits the TSA adsorption vessel for delivery potentially to a downstream cryogenic CO separation cold box. The 3 A-zeolite works because it does not allow CO to enters its pore structure. This keeps the temperature low in the 3 A-zeolite section due to the absence of CO heat of adsorption and restricts CO from the pore system of the 3 A-zeolite which can catalyze unwanted reactions. Furthermore, any water formed on the other adsorbents in the adsorption vessel employed for carbon dioxide adsorption (such as 13 X-zeolite) would be re-adsorbed on the cool 3 A-zeolite adjacent the outlet end of the TSA adsorption vessel.

The present invention has been set forth with regard to several preferred examples, but the full scope of the present invention should be ascertained from the claims which follow.

We claim:

1. A process for the removal of water and carbon dioxide from a feed synthesis gas containing water and carbon dioxide by contacting said feed synthesis gas at elevated pressure with a zone of a first adsorbent capable of adsorbing water and carbon dioxide from said feed synthesis gas, comprising a) introducing said feed synthesis gas into an inlet end of said zone and removing a substantially dry and carbon dioxide-free synthesis gas from an outlet end of said zone;

b) regenerating said zone by at least reducing the pressure of said zone; and c) repressurizing said zone from said outlet end with substantially dry, carbon dioxide-free synthesis gas, wherein said outlet end of said zone of adsorbent contains a second adsorbent capable of adsorbing water but not capable of adsorbing carbon monoxide and said substantially dry, carbon dioxide-free synthesis gas used to repressurize said zone of adsorbent contacts said second adsorbent prior to contacting said first adsorbent.

2. The process of claim 1 wherein said first adsorbent is 13 X-zeolite.

3. The process of claim 1 wherein said second adsorbent is 3 A-zeolite.

4. The process of claim 3 wherein said 3 A-zeolite is substantially cation exchanged with potassium.

5. The process of claim 1 wherein said zone is further regenerated with a substantially dry and carbon dioxide-free gas at elevated temperature introduced through said outlet end of said zone.

6. The process of claim 5 wherein said elevated temperature is in the range of approximately 100 to 400° C.

7. The process of claim 5 wherein said zone is cooled with a substantially dry and carbon dioxide-free gas at ambient temperature subsequent to regeneration with said substantially dry and carbon dioxide-free gas at elevated temperature.

8. The process of claim 5 wherein said substantially dry and carbon dioxide-free gas is selected from the group consisting of nitrogen, hydrogen, carbon monoxide, synthesis gas and mixtures thereof.

9. The process of claim 1 wherein said second adsorbent comprises from approximately 1 to 30% by length of said zone.

10. The process of claim 1 wherein said second adsorbent comprises approximately 15% by length of said zone.

11. The process of claim 1 wherein at least two parallel connected zones are used in which said feed synthesis gas contacts a first zone while a second zone is being regenerated.

12. The process of claim 1 wherein said first adsorbent comprises one or more layers of adsorbent selected from the group consisting of 13 X-zeolite, 4 A-zeolite, mordenite, activated alumina and mixtures thereof.

13. The process of claim 1 wherein said first adsorbent comprises a layer of silica gel followed by a layer of adsorbent selected from the group consisting of 13 X-zeolite, activated alumina and mixtures thereof.

14. The process of claim 1 wherein said elevated pressure of said feed synthesis gas is greater than approximately 300 psig.

15. The process of claim 1 wherein said pressure of regenerating is in the range of approximately 0 to 500 psig.

16. The process of claim 1 wherein said substantially dry and carbon dioxide-free synthesis gas is at a pressure of approximately said feed synthesis gas.

17. A process for the removal of water and carbon dioxide from a feed gas containing predominantly hydrogen and carbon monoxide and minor amounts of water and carbon dioxide by contacting said feed gas at elevated pressure with a zone of 13 X-zeolite adsorbent capable of adsorbing water and carbon dioxide from said feed gas, comprising:

a) introducing said feed gas into an inlet end of said zone and removing a substantially dry and carbon dioxide-free, predominantly hydrogen and carbon monoxide gas from an outlet end of said zone;

b) regenerating said zone by depressurizing said zone and passing a substantially dry, carbon dioxide-free purge gas through said zone at elevated temperature and reduced pressure; and c) repressurizing said zone from said outlet end with substantially dry, carbon dioxide-free predominantly hydrogen and carbon monoxide gas, wherein said outlet end of said zone of adsorbent contains 3 A-zeolite adsorbent capable of adsorbing water, but not capable of adsorbing carbon monoxide and said substantially dry, carbon dioxide-free predominantly hydrogen and carbon monoxide gas used to repressurize said zone of adsorbent contacts said 3 A-zeolite adsorbent prior to contacting said 13 X-zeolite adsorbent.

* * * * *